(12) United States Patent
Wang (10) Patent No.: US 11,360,531 B1
(45) Date of Patent: Jun. 14, 2022

(54) REDEPLOYMENT OF ENERGY STORAGE UNITS

(71) Applicant: Amazon Technologies, Inc., Seattle, WA (US)

(72) Inventor: Ligong Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 433 days.

(21) Appl. No.: 16/442,351

(22) Filed: Jun. 14, 2019

(51) Int. Cl.
| | |
|---|---|
| G06F 1/26 | (2006.01) |
| H01M 10/48 | (2006.01) |
| H02J 7/00 | (2006.01) |
| H02J 9/06 | (2006.01) |

(52) U.S. Cl.
CPC .......... G06F 1/263 (2013.01); H01M 10/48 (2013.01); H02J 7/0068 (2013.01); H02J 9/061 (2013.01); H01M 2220/10 (2013.01)

(58) Field of Classification Search
CPC ... G06F 1/263; H01M 10/48; H01M 2220/10; H02J 7/0068; H02J 9/061
See application file for complete search history.

(56) References Cited

U.S. PATENT DOCUMENTS

| | | | | |
|---|---|---|---|---|
| 2014/0292344 A1* | 10/2014 | Le Neel | ............... | G01R 31/392 324/426 |
| 2015/0188137 A1* | 7/2015 | Komatsu | ............... | H01M 4/587 429/231.8 |
| 2017/0350946 A1* | 12/2017 | Mukaitani | ............. | H01M 50/20 |
| 2018/0067528 A1* | 3/2018 | Wang | .................... | H02J 7/0014 |
| 2021/0168964 A1* | 6/2021 | Nakaya | ................... | H02J 9/062 |

* cited by examiner

*Primary Examiner* — Toan T Vu
(74) *Attorney, Agent, or Firm* — Kilpatrick Townsend & Stockton LLP (57) ABSTRACT

Methods for redeploying used battery units can include capturing performance data of an energy storage unit containing a battery unit at the end of its useful life for a primary application, and determining, based on the performance data, a remaining energy output capacity. If the battery unit meets or exceeds threshold performance criteria, the battery unit can be incorporated into a second energy storage unit and reconfigured to reflect the remaining energy output capacity. The second storage unit can include the redeployed battery unit alone, or in combination with any suitable number of additional battery units.

17 Claims, 7 Drawing Sheets

REDEPLOYMENT OF ENERGY STORAGE UNITS

BACKGROUND

A datacenter typically contains a collection of computer servers and components for the management, operation, and connectivity of those servers, including short-term and long-term backup power solutions to prevent data loss during power loss events. In large datacenters, the cumulative backup power requirements can lead to the deployment of numerous energy storage units, such as but not limited to high-capacity backup battery units (BBUs). Energy storage units are frequently used in conjunction with industrial, commercial, and power generation applications as well.

Individual energy storage units can be selected for a given application based on the power requirements of that application, the power output capabilities of the energy storage unit, and the projected useful life of the energy storage unit. The useful life of an energy storage unit can vary, and may depend on several external factors, such as whether the energy storage unit is frequently charged and discharged, whether the energy storage unit is subjected to extremes of cold or heat, and the output of the energy storage unit.

BRIEF DESCRIPTION OF THE DRAWINGS

Various embodiments in accordance with the present disclosure will be described with reference to the drawings, in which.

DETAILED DESCRIPTION

In a modern datacenter, the continuity of power to servers and other electronic components can be maintained by employing redundant power supplies, including backup battery units (BBUs). Due to the high power demands of datacenter systems, and the unpredictable nature of line power outages, BBUs in a modern datacenter are typically well-distributed through the datacenter architecture and have large capacities. However, the precise lifespan of any given BBU is difficult to predict until near the end of its service life, because battery degradation is influenced to different degrees by many factors including frequency of use (charge and discharge), temperature at rest, rate of charge or discharge, initial capacity, and other factors. For these reasons, BBUs located at different parts of the same datacenter, or even in the same rack can be subject to different rates of degradation and thus have widely varying service life. However, even when battery packs for a BBU have reached the end of their useful service life for a given application, significant charge capacity can still remain in the battery packs.

Various datacenter applications require not only high capacity, but high reliability. For that reason, BBUs may be retired from service when they have undergone a predetermined number of cycles, a number of high-stress events (e.g., outages requiring extensive use), or have been operating for a predetermined amount of time, which can be on the order of several years or can be shorter. According to some embodiments, a service life for a datacenter BBU may be determined by time, e.g. on the order of three years (or more), or in the range of three to seven years; may be determined by charge/discharge cycle count, e.g., at least 100, preferably at least 300 charge/discharge cycles; or may be determined by both service duration and charge/discharge count, whichever occurs first. However, the capacity and reliability requirements for one BBU (e.g., powering an essential server rack) are not necessarily the same as those required for another (e.g., powering nonessential services such as backup data storage); nor the same as those required for non-datacenter applications, such as bulk power storage for utilities, power storage for residential power generation or for rapid charging stations (e.g. electric vehicle stations), or other use cases.

Embodiments described herein are directed to methods and systems of managing used battery units, such as but not limited to BBUs, to efficiently repurpose battery units at the end of their primary service life. In addition, embodiments are directed to methods of detecting and erasing potentially sensitive data concerning a given battery unit's primary service life, to reconfigure the battery units, and to assemble alternative energy storage units using the redeployed battery units for new applications.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
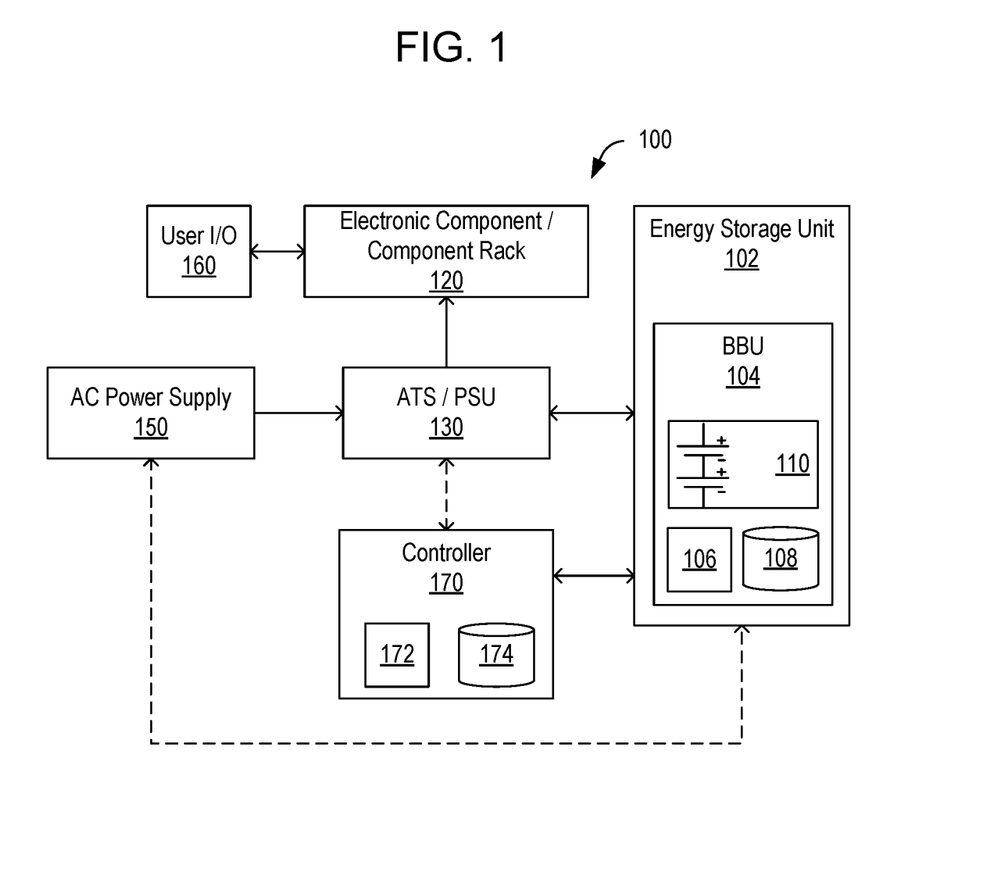
FIG. 1 is a high-level block diagram illustrating a system for powering electronic components using energy storage units that include backup battery units (BBUs), in accordance with various embodiments.

Turning now to the figures, in which like numbers indicate like elements, FIG. 1 is a high-level block diagram illustrating a system 100 for powering electronic components 120 typical of a datacenter, including an automated transfer switching and power supply unit 130 that can provide power to the electronic components from either an AC power supply 150 or from a battery energy storage unit 102, which can include any suitable number of BBUs 104. Although BBUs are referenced throughout this disclosure, it will be understood that the principles described herein can apply to battery energy storage units that are used for purposes other than use as backup power. Such battery energy storage units can include, but are not limited to, power storage for home use, industrial use, or utilities; temporary power storage or buffering in association with local or residential power generation (e.g., solar power); temporary power storage in association with recharging stations for electric vehicles; rechargeable battery units for electric vehicles; or any other suitable battery-based energy storage system that includes rechargeable battery units that may have substantial usable capacity at the end of their primary service life.

Each BBU 104 may include an assembly of battery cells 110 and one or more local controllers or processors, e.g. local controller 106 and memory 108, which can be used to monitor aspects of the function of each BBU during use. Local controllers 106 and memory 108 can, for example, maintain records of each BBU's usage time, frequency of charge and discharge, rate of charge and discharge, output capacity, impedance, voltage, current, temperature, etc., in order to measure the change in BBU capacity over the service lifetime of the BBU, and to predict the end of that service life. Other use parameters that can be used to predict the end of a BBU's service life include, but are not limited to: coulomb counting, compensated end of discharge voltage, or other methods for monitoring current/energy stored by or discharged from battery cells.

A separate controller 170, which can include its own processor 172 and nonvolatile memory 174, can be used to monitor performance of the energy storage unit 102 either independently or in conjunction with local processing and memory described above. The system 100 can also include one or more user I/O modules 160 to provide information to a user, respond to queries, or receive user instructions.

The BBUs 104 contained in an energy storage unit 102 will generally decrease in output capacity over time and with use. For example, for some BBUs, the discharge energy (in Wh) representing a total capacity of a BBU may decrease by about half over a service lifetime of the BBU. For some applications (e.g., datacenter applications) a BBU may have, as a rating requirement, a minimum pack discharge energy on the order of 100-200 Whr or more, and may have an initial pack discharge rate when new on the order of 500-600 Whr or more. Depending on the environmental and/or use factors to which the BBU is subjected, the BBU may degrade from its initial rated capacity to its minimum capacity over the course of about 36 months or more; but the specific rate at which the capacity degrades can vary substantially depending on the frequency of charge/discharge cycling, the temperature at which the BBU is maintained, and other environmental and performance. By monitoring BBU conditions, the fuel gauge can predict the timing of the end of this service life, with or without intermittent measurements being conducted to determine the BBU's actual energy output capacity.

Figure 2:
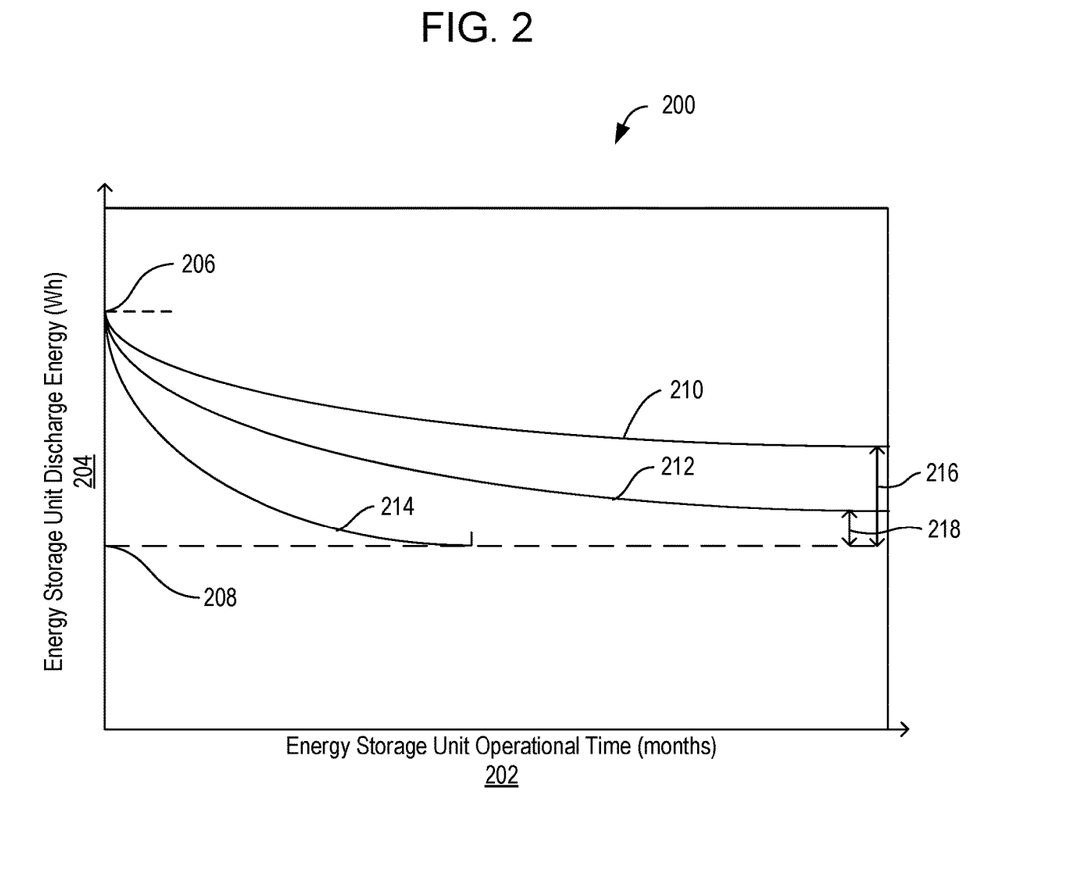
FIG. 2 shows a graph representing discharge energy capacity of various examples of energy storage units over time.

Examples of BBU output capacity decreasing over time are shown in FIG. 2. FIG. 2 is a graph showing output capacity in the form of an energy storage unit's maximum discharge energy 204 as a function of the storage unit's operational time 202. The example curves represent a high-performing first BBU 210 with high output capacity retention, a second high-performing BBU 212 with low output capacity retention, and a low-performing third BBU 214 that fails earlier than the maximum operational time.

In the first case, the high-performing first BBU 210 decreases in maximum output capacity (i.e., the maximum amount of energy that can be stored on a charge cycle) from an initial, peak output 206 toward a threshold minimum output 208. The first BBU 210 retains a high differential 216 above the threshold minimum output 208 at the end of its operational lifetime.

Although some variation between similarly rated BBUs exists, high end-of-life differentials can result from a particular BBU seeing favorable environmental conditions (e.g., stable and low operating temperatures, infrequent charge/discharge). In the second case, the second high-performing BBU 212 decreases in maximum output capacity over time, resulting in a much reduced differential 218 over the threshold minimum output 208 at end-of-life. Although this second BBU 212 has less remaining capacity that the first BBU 210, the standard curve and longevity of performance of the BBU indicate that the second BBU is also a candidate for repurposing. The amounts of the output capacity differentials 216, 218 at end-of-life can be used when re-rating each BBU for redeployment.

In the third case, the low-performing third BBU 214 decreases in maximum output capacity and fails to match the threshold minimum output 208 prior to the end of the projected operational lifetime. A BBU can be removed from service and replaced earlier than the originally projected service lifetime when early failure occurs, and may still possess remaining output capacity; however, early failure can also be indicative of extreme environmental stress, overloading, or of potential defects in the battery cells of a BBU. Therefore, early failure can be used as a criterion for disqualifying a BBU from redeployment.

Figure 3:
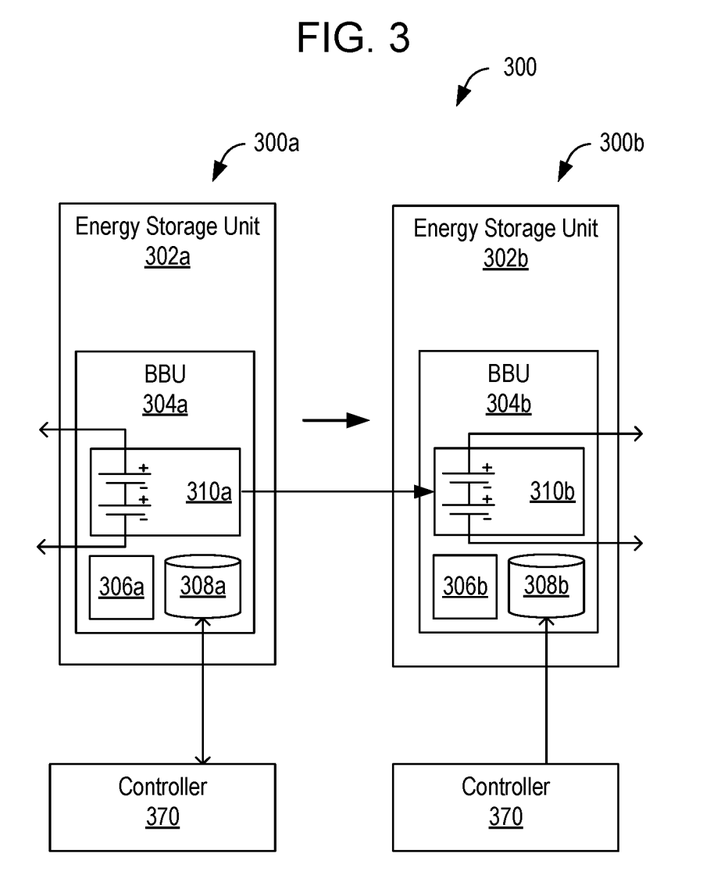
FIG. 3 is a block diagram illustrating a first approach for repurposing a battery from an energy storage unit.
Figure 4:
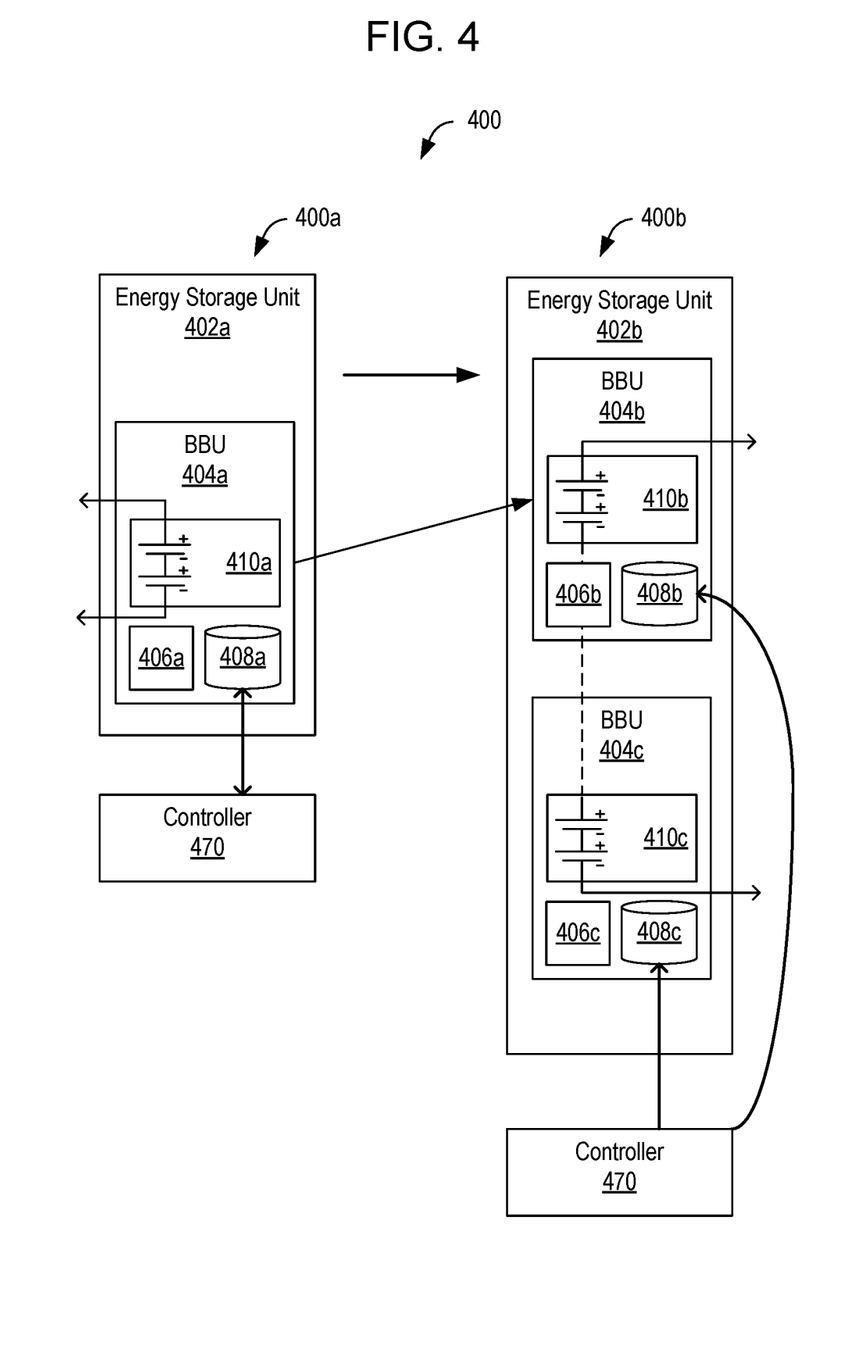
FIG. 4 is a block diagram illustrating a second approach for repurposing batteries from more than one energy storage unit.
Figure 5:
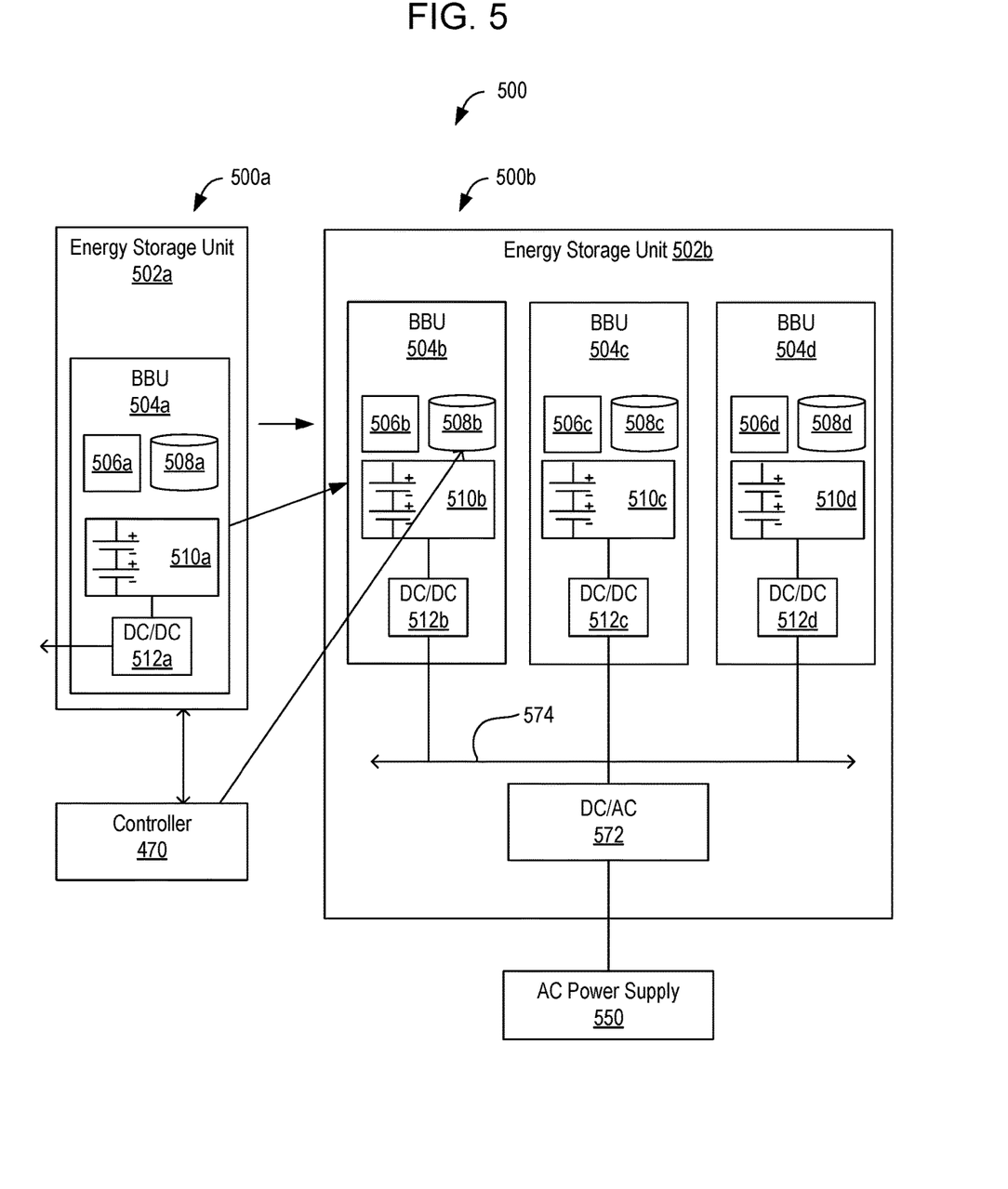
FIG. 5 is a block diagram illustrating a third approach for repurposing batteries from more than one energy storage unit.

FIGS. 3-5 illustrate various approaches to repurposing a battery unit. Again, though BBU's are used as the primary example, it will be understood that alternative battery units can be redeployed in a similar manner. Specifically, FIG. 3 is a block diagram illustrating a first approach 300 to repurposing a BBU 304a in an energy storage unit 302a, in accordance with various embodiments of the present disclosure. In an original configuration 300a, a controller (e.g. local controller 306a or system controller 370) can sense that the original BBU 304a has reached an end of its usable life, and generate a suitable indication or request to deactivate the BBU.

According to various embodiments, the system controller 370, either automatically or under user control, can access the local controller 306a of the original BBU 304a and/or local memory 308a in order to detect performance information of the BBU. This information can include, for example, the remaining capacity of the battery cells 310a of the BBU 304a, or other information on battery performance from which a new BBU capacity and service life can be projected. The system controller 370 may also, either automatically or under user control, access the local controller 306a and/or local memory 308a in order to scan for, detect, and erase information specific to the BBU's previous installation. In some embodiments, this takes the form of detecting potentially confidential information concerning the operating parameters of a datacenter such as charge/discharge history, power requirements, device names, service notes, etc. After the system controller 370 has captured the remaining capacity of the BBU, the system controller can erase any such potentially sensitive information.

In a second configuration 300b, a modified energy storage unit 302b can be assembled using a modified BBU 304b containing redeployed battery cells 310b originating from battery cells 310a of the original BBU 304a. In some embodiments, the redeployed battery cells 310b can be entirely removed from the original BBU 304a and inserted into a new BBU enclosure with a different processor 306b and memory 308b storing operational parameters for the modified BBU 304b based on data stored in memory 308a relating to the remaining capacity of the redeployed battery cells 310b. In some other embodiments, the original BBU 304a can be removed as a whole unit from its previous function, and the processor 306b and memory 308b can be the same hardware, modified by the erasure of prior operating history and replacement with the new operational parameters based on the remaining capacity of the redeployed BBU.

According to some embodiments, the local memory 308b can be modified by rewriting or formatting the local memory with a new memory image capturing the new operational parameters as if they were original operational parameters. The modified energy storage unit 302b will typically have a much lower peak output capacity than the original energy storage unit 302a and a concomitantly reduced threshold minimum output, making the modified energy storage unit suitable for energy storage applications that have relatively low power requirements compared to those of the original energy storage unit. In some embodiments, the modified energy storage unit 302b may be used in conjunction with other modified energy storage units, in bulk, for energy storage applications that are not space-limited, or for residential use.

According to some embodiments, BBUs can be redeployed to meet power output demands that are similar to their original specifications by recombining BBUs in series. For example, FIG. 4 is a block diagram illustrating a second approach 400 to repurposing a BBU 404a in an energy storage unit 402a, in accordance with various embodiments of the present disclosure. In an original configuration 400a, a controller (e.g. local controller 406a or system controller 470) can sense that the original BBU 404a has reached an end of its usable life, and generate a suitable indication or request to deactivate the BBU.

According to various embodiments, the system controller 470, either automatically or under user control, can access the local controller 406a of the BBU 404a and/or local memory 408a in order to detect performance information of the BBU. This information can include, for example, the remaining capacity of the battery cells 410a of the BBU 404a, or other information on battery performance from which a new BBU capacity and service life can be projected, similar to the approach 300 shown with reference to FIG. 3. The system controller 470 may also, either automatically or under user control, access the local controller 406a and/or local memory 408a in order to scan for, detect, and erase information specific to the BBU's previous installation; and to replace the information with new operating parameters.

In a second configuration 400b, a modified energy storage unit 402b can be assembled by combining a modified BBU 404b containing the redeployed battery cells 410b with a second BBU 404c containing a second set of battery cells 410c, and optionally any suitable number of additional BBUs. In various embodiments, the original BBU 404a can be removed as a whole unit from its previous function, and the processor 406b and memory 408b can be modified by replacing previously recorded operational data and parameters with the new operational parameters based on the remaining capacity of the redeployed BBU 404b. The modified controller 406b and memory 408b can be the same hardware, or can be different from the original controller 406a and memory 408a.

According to some embodiments, each of the BBUs 404b, 404c, etc. making up the new energy storage unit 402b can include independent local controllers 406b, 406c and memory stores 408b, 408c. In these embodiments, each local controller 406b, 406c can monitor BBU performance of its associated set of battery cells 410b, 410c. In various other embodiments, the new energy storage unit 402b can selectively use one set of a local controller and memory store (e.g., 406b, 406c) for monitoring and controlling all of the battery cells 410b, 410c for the energy storage unit.

According to some embodiments, BBUs can be redeployed for providing types of power supply different from those corresponding to their original specifications, e.g. by recombining BBUs in bulk or in parallel. For example, FIG. 5 is a block diagram illustrating a third approach 500 to repurposing a BBU 504a in an energy storage unit 502a, in accordance with various embodiments of the present disclosure. In an original configuration 500a, a controller (e.g. local controller 506a or system controller 570) can sense that the original BBU 504a has reached an end of its usable life, and generate a suitable indication or request to deactivate the BBU.

According to various embodiments, the system controller 570, either automatically or under user control, can access the local controller 506a of the BBU 504a and/or local memory 508a in order to detect performance information of the BBU. This information can include, for example, the remaining capacity of the battery cells 510a of the BBU 504a, or other information on battery performance from which a new BBU capacity and service life can be projected, similar to the approaches 300 and 400 shown with reference to FIGS. 3 and 4. The system controller 570 may also, either automatically or under user control, access the local controller 506a and/or local memory 508a in order to scan for, detect, and erase information specific to the BBU's previous installation; and to replace the information with new operating parameters.

In a second configuration 500b, a modified energy storage unit 502b can be assembled by combining a modified BBU 504b containing the redeployed battery cells 510b with multiple additional BBU's 504c, 504d, (and optionally further, additional BBUs), each BBU containing a set of battery cells 510c, 510d. Each BBU 504b, 504c, 504d can also include local power conditioning or power regulating circuits (e.g., DC/DC converters) 512b, 512c, 512d that can be used to step the power supplied by each BBU for recombination along a relatively high-voltage DC line 574, which can optionally connect with further power conditioning or regulating circuits 572 (e.g. DC/AC converter, filter, or the like) to either supply power to or receive power from an AC circuit or AC power supply 550 (or alternatively, to regulate power quality to or from a DC circuit or DC power supply). Power conditioning and/or regulating circuits 572 can include one or more multi-phase converters as well, for linking the modified energy storage unit 502b with a multi-phase power system or high-voltage system.

In various embodiments, the original BBU 504a can be removed as a whole unit from its previous function, which can also include local conditioning circuits 512a. The local controller 506b and memory 508b can be modified by replacing previously recorded operational data and parameters with the new operational parameters based on the remaining capacity of the redeployed BBU 504b. The modified controller 506b and memory 508b can be the same hardware, or can be different from the original controller 506a and memory 508a.

According to some embodiments, each of the BBUs 504b, 504c, 504d etc. making up the new energy storage unit 502b can include independent local controllers 506b, 506c, 506d and memory stores 508b, 508c, 508d. In these embodiments, each local controller 506b, 506c can monitor BBU performance of its associated set of battery cells 510b, 510c, 510d. In various other embodiments, the new energy storage unit 502b can selectively use one set of a local controller and memory store (e.g., 506b, 506c) for monitoring and controlling all of the battery cells 510b, 510c, 510d for the energy storage unit. In some embodiments, each BBU 504b, 504c, 504d, or any number of the BBUs, of the modified energy storage unit 502b can be a redeployed BBU that has been previously removed from a primary application.

Various methods for implementing the approaches to repurposing battery units described above are described in detail with reference to FIGS. 6 and 7. Some or all of process 600, as well as process 700 described below (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In various embodiments, the processes 600, 700, or combinations thereof may be carried out by, e.g., a centralized controller such as controller 170 (FIG. 1), by distributed control by onboard processing at one or more BBU's 102, or by distributed control by one or more power supply controllers.

Figure 6:
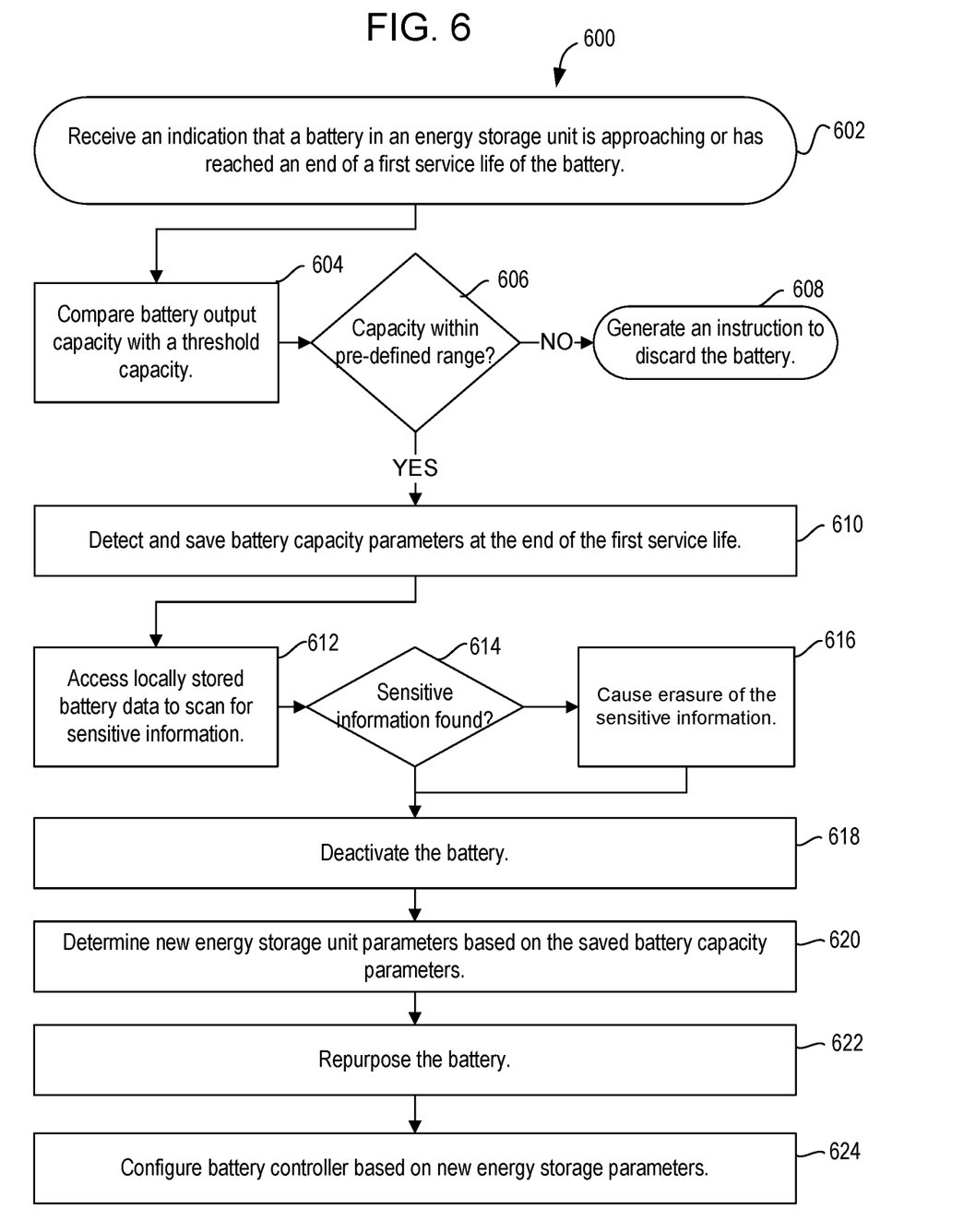
FIG. 6 illustrates a process for repurposing a battery from one energy storage unit for use in a new energy storage unit.
Figure 7:
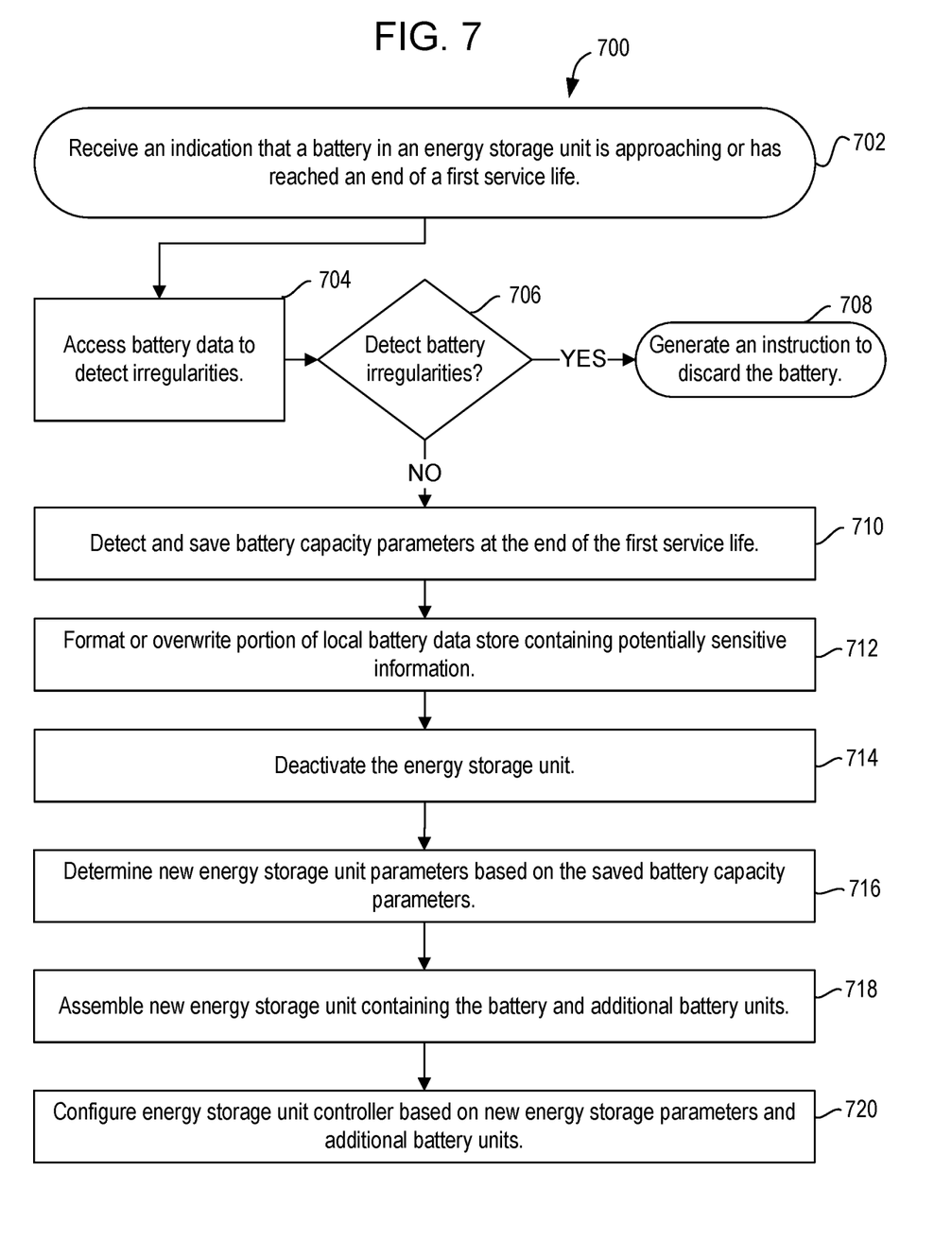
FIG. 7 illustrates a second process for repurposing a battery from an energy storage unit for use with additional batteries in a new energy storage unit.

FIG. 6 illustrates a first process 600 for repurposing a battery from one energy storage unit for use in a new energy storage unit in accordance with the approach of FIG. 3, in conjunction with any of the systems or devices shown in FIG. 1 or 3-5. In the process 600, an energy storage unit controller or control system can receive an indication that a battery in an energy storage unit is approaching or has reached an end of its service life. (Act 602) The system can then compare battery output capacity with a threshold capacity. (Act 604) (See, e.g., FIG. 2) Insufficient capacity can be indicative that a battery is not suitable for reuse, and may occur if the battery has reached the end of its useful life prematurely (e.g., due to overuse, exposure to extreme conditions, tampering, other environmental conditions, or defects). If the system detects that the capacity is within a pre-defined range, which may be a range indicative of normal operation of the battery, (Act 606), the battery can be redeployed. If the system detects that the capacity is insufficient, it can generate an instruction to discard the battery. (Act 608).

If the battery is usable, the system can assess the battery by detecting and saving battery capacity parameters (e.g., including but not limited to the remaining power output capacity of the battery) at the end of its first service life. (Act 610) According to some embodiments, the power output capacity can be measured by performing, or by accessing records of, a discharge/charge cycle of the battery that is indicative of output capacity. According to various other embodiments, the power output capacity can be tracked over time and stored by the battery or an associated controller in memory, and accessed to determine the health of the battery.

The system can access locally stored battery data to scan for potentially sensitive information. (Act 612) This information can include, e.g., any information that may be used to reconstruct datacenter operations, such as but not limited to: original battery capacity information, charge/discharge history, stored designators or labeling indicative of the particular function of the battery unit, stored maintenance notes, or other similar information. Upon detection of potentially sensitive information, (Act 614) the system can cause erasure of the sensitive information. (Act 616) According to some embodiments, erasure of sensitive information can be selective, e.g. by accessing and rewriting local memory of the redeployed BBU. Alternatively, erasure of sensitive information can be uniform, by formatting or reimaging local memory of a redeployed BBU, typically with new information corresponding to the output capacity, expected life, and function of the BBU as modified for its new application.

The system can subsequently deactivate the battery, (Act 618) and set new energy storage unit parameters based on the previously assessed and saved battery capacity parameters. (Act 620) According to some alternative embodiments, the remaining power output capacity can be assessed after the BBU is deactivated and removed from its original application. The BBU can then be redeployed, which can include physical installation into a new application (e.g. new server rack, electronics rack, bulk power storage assembly, etc.). (Act 622) The new energy storage unit, including the redeployed BBU, can then be configured by configuring an associated battery controller based on new energy storage parameters of the redeployed BBU. (Act 624) This configuration may include reconfiguring the same hardware (e.g. memory) originally associated with the redeployed BBU, or may include configuring a different local controller and memory with settings corresponding to the new energy storage parameters of the redeployed BBU.

As discussed above with reference to FIGS. 4 and 5, battery units can also be reconfigured in conjunction with multiple and potentially many other battery units. FIG. 7 illustrates a second process 700 for repurposing a battery from one energy storage unit for use in conjunction with other battery units in a new energy storage unit in accordance with the approaches of FIGS. 4-5, in conjunction with any of the systems or devices shown in FIG. 1 or 3-5. In the process 700, an energy storage unit controller or control system can receive an indication that a battery in an energy storage unit is approaching or has reached an end of its service life. (Act 702). The system can access battery data to detect irregularities, such as but not limited to: an abnormal rate of change in the battery's output capacity over time, especially an early failure to meet a minimum threshold output capacity; recorded extremes of temperature outside of a preferred range during the lifetime of the battery; records of battery unit failure; or other indicators of potential damage or abnormal degradation. (Act 704) If the system detects a battery irregularity (Act 706), the system can generate an instruction to discard the battery. (Act 708)

The system can detect and save battery capacity parameters (e.g., including but not limited to a remaining power output capacity of the battery) at the end of the battery's first service life, (Act 710) in order to use the saved battery capacity parameters (e.g., remaining power output capacity) to predict the useful life of the battery based on a reduced minimum output threshold. The system may then format or overwrite a portion of a local battery data store containing potentially sensitive information, (Act 712) and deactivate the original battery unit or original energy storage unit to permit removal of the battery unit. (Act 714)

New energy storage unit parameters can be determined based on the previously saved battery capacity parameters (e.g. remaining power output capacity) of the battery unit, (Act 716) and the battery unit can be assembled with a new energy storage unit containing the redeployed battery unit and any suitable number of additional battery units. (Act 718) In some embodiments, multiple and potentially all such battery units in the new energy storage unit can be redeployed; and each such battery unit may be selected based on their respective remaining capacities and projected forward-looking useful life, in order to balance output across multiple redeployed battery units and to minimize waste of potentially high-performing battery units. A new energy storage unit controller can be configured (e.g., including settings for the initial power output capacity, projected life, and threshold minimum capacity) based on the new energy storage parameters of the redeployed battery unit and any additional battery units. (Act 720) This configuration can include, in some embodiments reconfiguring existing hardware (local controllers, memory) of each battery unit; selecting and configuring one such existing local controller and memory unit from among the BBUs; or configuring a new controller and memory associated with the new energy storage unit.

Various computing environments may be used, as appropriate, to implement various embodiments as described herein including web- or cloud-based computing environments, computing environments based on local controllers, or combinations of the above. User or client devices can include any of a number of general purpose personal computers, such as desktop or laptop computers running a standard operating system, as well as cellular, wireless and handheld devices running mobile software and capable of supporting a number of networking and messaging protocols. Such an environment also can include a number of workstations running any of a variety of commercially-available operating systems and other known applications for purposes such as development and database management. These workstations also can include other electronic devices, such as dummy terminals, thin-clients, gaming systems and other devices capable of communicating via a network and used for communicating with sensors, displays, actuators, and user interfaces, among other devices.

For example, user interfaces (such as user I/O module 160, FIG. 1) can include any appropriate device operable to send and receive requests, messages, or information over an appropriate network and convey information back to a user of the device. Examples of such devices include portable displays, personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used in conjunction with such a network can depend at least in part upon the type of network and/or environment selected. Protocols and components for communicating via such a network are well known and will not be discussed herein in detail. Communication over the network can be enabled by wired or wireless connections and combinations thereof.

Suitable computing environments can include, in various embodiments, a server and data store. It should be understood that there can be several servers, layers, or other elements, processes, or components, which may be chained or otherwise configured, which can interact to perform tasks such as obtaining data, processing said data, and communicating data or with users. For example, according to various embodiments, a controller such as controller 170 (FIG. 1) can include a server and/or a virtual machine emulated by a server. As used herein the term "data store" refers to any device or combination of devices capable of storing, accessing, and retrieving data, which may include any combination and number of data servers, databases, data storage devices, and data storage media, in any standard, distributed, or clustered environment. The server can include any appropriate hardware and software for integrating with the data store as needed to execute aspects of one or more applications for the client device, handling a majority of the data access and logic for an application. It should be understood that servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store can include a mechanism for storing data for reporting, analysis, or other such purposes. The data store is operable, through logic associated therewith, to receive instructions and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

A computing environment according to various embodiments can be a distributed computing environment utilizing several computer systems and components that are interconnected via communication links, using one or more computer networks or direct connections. However, it will be appreciated by those of ordinary skill in the art that the embodiments discussed above could operate equally well in a computing environment having fewer or a greater number of components, including systems operated under the control of a single computing device in communication with any suitable combination of the various sensors, input/output devices and/or actuators discussed herein.

Some embodiments may utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

Computing environments as discussed herein can include a variety of data stores and other memory and storage media as discussed above. These media can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Suitable media can also include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of redeploying a battery unit used to provide backup power in a datacenter environment, the method comprising:
   using a first energy storage unit in a datacenter to provide backup power to one or more electronic components, the first energy storage unit comprising a first battery unit, a first controller configured to sense performance attributes of the battery unit, and a first memory device configured to store the performance attributes;
   detecting that the first battery unit has reached an end of a useful life of the first battery unit in the datacenter environment;
   determining, based on the stored performance attributes, that a remaining energy output capacity of the first battery unit exceeds a threshold energy output capacity; and
   in response to the determination that the remaining energy output capacity exceeds the threshold energy output capacity:

erasing a portion of the first memory device storing data for usage of the first battery unit in the datacenter environment;

incorporating the first battery unit into a second energy storage unit that includes a second controller and a second memory device; and configuring the second controller and the second memory device to reflect the remaining energy output capacity of the first battery unit.

2. The method of claim 1, wherein:

the second controller is different from the first controller; and the second memory device is different from the first memory device.

3. The method of claim 1, wherein the second energy storage unit comprises additional battery units, the method comprising:

operably connecting the first battery unit with the additional battery units; and configuring the second controller and the second memory device based on energy output capacities of the additional battery units.

4. The method of claim 1, comprising:

identifying, in the first memory device, sensitive information corresponding to the usage of the first battery unit in the datacenter environment; and selectively erasing the sensitive information from the first memory device.

5. The method of claim 1, wherein the detection that the first battery unit has reached the end of the useful life comprises one or more of:

detecting that the first battery unit has operated for longer than a predefined period of time;

detecting that the first battery unit has been discharged and recharged more than a predefined number of times; or detecting that the remaining energy output capacity of the first battery unit has fallen below a predefined energy output capacity threshold.

6. The method of claim 1, further comprising:

detecting that a second battery unit has reached an end of a useful life of the second battery unit in the datacenter environment;

detecting an irregularity in a second performance attribute of the second battery unit; and in response to the detection of the irregularity, generating an instruction to discard the second battery unit.

7. A method, comprising:

detecting, based on performance data of a first energy storage unit comprising a first battery unit configured to store electrical power, that the first battery unit has reached an end of a useful life for a primary application of the first battery unit;

determining, based on the performance data, whether a remaining energy output capacity of the first battery unit meets or exceeds a threshold energy output capacity; and in response to a determination that the remaining energy output capacity exceeds the threshold energy output capacity:

physically installing the first battery unit, along with a first controller connected with the first battery unit, in a second energy storage unit;

reconfiguring the first controller to control the first battery unit in the second energy storage unit based on the remaining energy output capacity of the first battery unit; and configuring the second energy storage unit to reflect the remaining energy output capacity of the first battery unit.

8. The method of claim 7, wherein the detection that the first battery unit has reached the end of the useful life comprises at least one of:

detecting that the first battery unit has operated for longer than a predetermined period of time; or detecting that the first battery unit has been discharged and recharged more than a predefined number of times.

9. The method of claim 7, further comprising:

in response to a determination that the remaining energy output capacity is less than the threshold energy output capacity, generating an instruction to discard the first battery unit.

10. The method of claim 9, wherein the second energy storage unit comprises an additional battery unit, the method comprising:

electrically connecting the first battery unit into the second energy storage unit in series with the additional battery unit; and configuring the second energy storage unit to reflect a total output capacity of the first battery unit and the additional battery unit based on the remaining energy output capacity of the first battery unit.

11. The method of claim 7, wherein the second energy storage unit comprises additional battery units, the method comprising:

electrically connecting the first battery unit into the second energy storage unit with the additional battery units; and configuring the second energy storage unit to reflect a total output capacity of the first battery unit and the additional battery units based on the remaining energy output capacity of the first battery unit.

12. The method of claim 11, wherein the additional battery units are electrically connected in parallel with each other, the method comprising:

electrically connecting the first battery unit in parallel with the additional battery units; and electrically connecting the first battery unit and the additional battery units with a power conditioning circuit or a power regulating circuit.

13. The method of claim 7, comprising:

prior to incorporating the first battery unit into the second energy storage unit, detecting whether confidential information is stored in a memory device connected with the first battery unit; and in response to a detection that confidential information is stored in the memory device, causing erasure of the confidential information from the memory device.

14. The method of claim 7, comprising:

prior to incorporating the first battery unit into the second energy storage unit, erasing or overwriting at least a portion of a memory device connected with the first battery unit, the portion being associated with storing confidential information.

15. An electrical storage unit, comprising:

a redeployed battery unit; and a controller connected to the redeployed battery unit and configured to store an initial output energy capacity of the redeployed battery unit and to track an amount of energy stored in the redeployed battery unit; wherein wherein the redeployed battery unit comprises a previously used battery unit that reached an end of an original service life;

wherein the initial energy output capacity of the redeployed battery unit is determined based on a remaining energy output capacity of the previously used battery unit obtained at the end of the original service life;

wherein the controller connected to the redeployed battery unit comprises a redeployed controller previously used to track an amount of energy stored in the previously used battery unit; and wherein subsequent to the end of the original service life, the controller has been overwritten to prevent access to original data obtained during the original service life.

16. The electrical storage unit of claim 15, further comprising:

an additional battery unit, electrically connected in series with the redeployed battery unit; wherein the controller is configured to store a combined initial energy output capacity of the additional battery unit and the redeployed battery unit, and to track an amount of energy stored in a combination of the additional battery unit and the redeployed battery unit.

17. The electrical storage unit of claim 15, further comprising additional battery units, and wherein:

the redeployed battery unit is electrically connected in parallel with each of the additional battery units;

the controller is configured to store a combined initial energy output capacity of the additional battery units and the redeployed battery unit, and to track an amount of energy stored in a combination of the additional battery units and the redeployed battery unit; and the redeployed battery unit and the additional battery units are electrically connected with a power conditioning circuit or a power regulating circuit.

* * * * *